United States Patent Office 3,480,571
Patented Nov. 25, 1969

3,480,571
POLYHALOGENATED UNSATURATED CYCLIC ALCOHOLS
Louis G. Anello, Basking Ridge, and Richard F. Sweeney, Randolph Township, Dover, N.J., assignors to Allied Chemical Corporation, New York, N.Y., a corporation of New York
No Drawing. Filed Oct. 24, 1965, Ser. No. 505,008
Int. Cl. C07c 35/18, 29/24; C08g 51/34
U.S. Cl. 260—617                    12 Claims

ABSTRACT OF THE DISCLOSURE

Compounds of the formula:

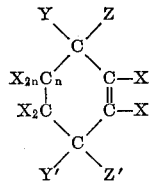

wherein $n$ is 0 or 1; X is F or Cl; Y or Y' is Cl, F or H and Z or Z' is Cl, F or OH; provided that at least one of Y or Y' is H and that when Y is H, Z is OH and when Y' is H, Z' is OH and also provided that there is present at least two fluorine atoms in the molecule, are prepared by reducing the corresponding perhalogenated cycloalkenone or cycloalkenedione. These compounds are useful as solvents for "Capran" type nylon (nylon 6), as intermediates for the preparation of polyacrylates; some of the compounds are useful as herbicides and some as solvents and sealing adjuvants for films of polytrifluorochloroethylene.

---

This invention relates to the production of a novel class of halogenated, unsaturated, cyclic alcohols.

It is an object of this invention to provide a novel class of chemical compounds and more particularly to provide a class of mono- and dihydroperhalogenated, cyclopentenyl and cyclohexenyl, mono- and dialcohols, the halogen atoms being fluorine or chlorine, there being a minimum of two fluorine atoms ring-substituted in the molecule.

Other objects and advantages will be apparent from the following description and discussion of the subject invention.

The novel class of mono- and dihydroperhalogenated, cycloalkenyl, mono- and dialcohols may be represented by the formula:

I

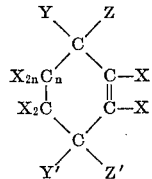

wherein $n$ is 0 or 1; X is F or Cl; Y or Y' is Cl, F or H and Z or Z' is Cl, F or OH; provided that at least one of Y or Y' is H and that when Y is H, Z is OH and when Y' is H, Z' is OH and also provided that there is present at least two fluorine atoms in the molecule.

The compounds of Formula I may be produced by reducing the corresponding perhalogenated cycloalkenone or cycloalkenedione having the formula:

II

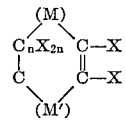

wherein $n$ and X are as defined above and M or M' is either

or

provided that at least one of M or M' is

and that there is present at least two fluorine atoms in the molecule; with sodium borohydride, in the presence of an inert polar solvent.

All of the novel compounds embraced by Formula I are characterized by the fact that: (a) said compounds contain an olefinically unsaturated double bond in the cyclic ring, (b) the compounds contain a hydrogen atom(s) bonded to the same carbon atom to which the —OH group(s) is attached, (c) the ring structure of the compounds is otherwise perhalogenated with chlorine or fluorine atoms and (d) the ring is substituted with at least two fluorine atoms. These novel compounds will hereafter be referred to as the hydro alcohols.

Characteristics common to all of the hydro alcohols are that they are useful as solvents for Capran (nylon 6) and that they are useful as intermediates in the preparation of acrylates, which in turn are useful to impart oleophobic and hydrophobic properties to textile materials. Many of the hydro alcohols also exhibit herbicidal properties.

Those compounds within the scope of the invention which possess at least two ring-substituted chlorine atoms, possess a characteristic not possessed by other compounds falling within the scope of Formula I, in that such compounds are useful as solvents and sealing adjuvants for films of polytrifluorochloroethylene.

As illustrative of the scope and intendment of the invention, the following represents a partial listing of the novel compounds falling within the scope of the invention; it being understood that this listing is for illustrative purposes only, said listing being all inclusive and the inventors not limited thereby, but only by the scope of the invention as defined in the claims:

1-hydro-2,3-dichlorotetrafluoro-2-cyclopenten-1-ol
1-hydro-2,3-dichlorohexafluoro-2-cyclohexen-1-ol
1,4-dihydro-2,3-dichlorodifluoro-2-cyclopenten-1,4-diol
1,4-dihydro-2,3-dichlorotetrafluoro-2-cyclohexen-1,4-diol
1-hydro-4,4-dichlorotetrafluoro-2-cyclopenten-1-ol
1-hydro-2,5,5-trichlorotrifluoro-2-cyclopenten-1-ol
1-hydro-perfluoro-2-cyclopenten-1-ol 1,4-dihydro-2,5-dichlorodifluoro-2-cyclopenten-1,4-diol
1-hydro-2,3,4,5,6-pentachlorotrifluoro-2-cyclohexen-1-ol
1-hydro-3,6,6-trichloropentafluoro-2-cyclohexen-1-ol
1,4-dihydro-5,5-dichlorotetrafluoro-2-cyclohexen-1,4-diol
1,4-dihydro-perfluoro-2-cyclohexen-1,4-diol Preparation of the perhalogenated cycloalkene monoketone starting materials wherein the unsaturated carbon atoms both contain chlorine or fluorine atoms, or wherein the unsaturated carbon atom beta to the carbonyl group contains a chlorine atom and the unsaturated carbon atom alpha to the carbonyl group contains a fluorine atom, with the remainder of the halogen atoms on the ring being fluorine, may be accomplished by reacting the corresponding perhalogenated cycloalkene with sulfur trioxide in the presence of a boron compound or pentavalent antimony compound catalyst, at atmospheric pressure and at temperatures between about 0–100° C. This procedure is described more in detail in co-pending, commonly assigned application of Louis G. Anello, Melvin M. Schlechter, Richard F. Sweeney and Benjamin Veldhuis, Ser. No. 373,058, filed June 5, 1964, and now U.S. Patent 3,333,002, and in copending, commonly assigned application of Robert J. DuBois and Benjamin Veldhuis, Ser. No. 373,110, filed June 5, 1964, and now U.S. Patent 3,310,584. Perhalogenated cycloalkene monoketone starting materials wherein the unsaturated carbon atom beta to the carbonyl group contains a fluorine atom and the unsaturated carbon atom alpha to the carbonyl group contains a chlorine atom may be prepared by reacting the corresponding perhalogenated cycloalkene monoketone, excepting that both unsaturated carbon atoms contain chlorine atoms, with hydrogen fluoride in the presence of a chromium oxide compound catalyst at temperatures between about 250–600° C., as described more in detail in application Ser. No. 373,058 mentioned supra. The perhalogenated cycloalkene diketone starting materials may be prepared generally in the same manner as described above for the preparation of the corresponding monoketones, excepting that the $SO_3$ oxidation is carried out for a longer period of time in order to favor production of the diketones. The reaction is facilitated if temperatures are maintained at least above about 30° C. up to about 100° C. and under substantially anhydrous conditions. Production of such diketones is discussed more in detail in copending, commonly assigned application of Richard F. Sweeney and Henry R. Nychka, Ser. No. 373,057, filed June 5, 1964, and now U.S. Patent 3,330,624. Preparation of other mixed perchlorofluorocycloalkene mono- and diketone starting materials may be accomplished by methods known or obvious to the prior art. For example, as described by A. L. Henne et al., J.A.C.S., vol. 67, p. 1235 (1945), perchlorocyclopentene may be reacted with antimony trifluoride at elevated temperatures and at about 10 atmospheres of pressure to give a variety of perchlorofluorocycloalkene products in which the saturated carbon atoms contain various combinations of chlorine and fluorine atoms. L. A. Bigelow et al., in J.A.C.S., vol. 56, p. 2773 (1954), disclose the fluorination of hexafluorobenzene with elemental fluorine at temperatures between about 0–20° C. and in the presence of carbon tetrachloride to produce a number of perchlorofluorocycloalkene products. Chlorine atoms on the unsaturated carbon atoms of such products may be replaced with fluorine atoms, if desired, by use of KF in the presence of a polar solvent, as disclosed by J. T. Maynard, J. Org. Chem., vol. 28, p. 112 (1963). The perhalocycloalkene products can then be converted to the corresponding perhalogenated cycloalkene ketone starting materials by oxidation with sulfur trioxide in the presence of, e.g., antimony pentafluoride as disclosed heretofore. Other procedures for preparing the subject starting materials will occur to persons skilled in the art.

The sodium borohydride reduction of the perhalogenated cycloalkenones defined by Formula II, hereinafter referred to as ketone, to the hydroalcohols defined by Formula I, hereinafter referred to as alcohol, can be carried out in an ordinary reaction vessel constructed of glass or steel, for example, which reaction vessel may be optionally equipped with a dropping funnel, a condenser, a stirrer, a thermometer and heating or cooling means.

The amunt of sodium borohydride required to effect reduction of monoketone to monoalcohol may vary from about .1–2 moles of sodium borohydride for each mole of monoketone starting material. The amount of sodium borohydride required to effect reduction of diketone to dialcohol will, of course, be twice that required for the production of monoketones, as described herein. The following comments apply to the reduction of monoketones to monoalcohols. Substantial reduction is effected when the molar ratio of sodium borohydride to ketone is about 1:1. Use of sodium borohydride in excess of about 2 moles per mole of ketone does not produce any advantageous results but does not deleteriously affect the reaction, excepting that recovery of sought-for product will be more difficult, due to contamination of the product with unreacted sodium borohydride and complexes thereof. In general, mole ratios of about .5–2 moles of sodium borohydride per mole of ketone are preferred.

In carrying out the reaction, ketone may be added to the borohydride or vice-versa, however the addition of ketone to the borohydride is preferred.

The reduction reaction is preferably carried out in the presence of a polar solvent which is inert to reactants and products, such as dioxane, diethyl ether, diethylene glycol diethyl ether (diglyme), and the like. The inert polar solvent should be used in substantially anhydrous form.

The reduction reaction is exothermic and ordinarily temperatures, resulting from initial contacting and mixing of ketone and sodium borohydride, will reach about 25–40° C. For reasons of efficiency, temperatures in the reaction vessel should not be permitted to exceed the boiling point of the chosen solvent and preferably not above about 100° C. The optimum temperature range lies between 35–100° C. Temperature control can be effected by regulating the rate of addition of reactants, by external cooling means, or by a combination of the above. It has been found that best results are obtained when the reaction is carried out in two stages; a first stage of about 1–3 hours, in which the reaction temperature is not permitted to exceed about 25° C. and a second stage of about the same period of time or longer, in which the reaction temperature is increased to about 75° C., solvent permitting.

Reaction times are not critical and will vary depending upon such factors as particular reactants employed, reactant concentrations, rate of contacting reactants, reaction temperatures, and so forth. Some yield of alcohol will be produced in a very short period of time. Substantial yields are obtained after a total reaction period of about two hours, with substantially maximum yields being obtained after a total reaction period of about 2–6 hours. Reaction periods may be extended, if desired, up to about 24 hours or more, without any adverse effects.

Although the process can be carried out under atmospheric, subatmospheric or superatmospheric pressure; atmospheric pressure is effective, is most practical and accordingly is preferred.

Product recovery involves separation of sought-for alcohol reduction product from unreacted $NaBH_4$ and $NaBH_4$ complexes, which are formed during the course of the reaction. This can readily be accomplished by decomposing the excess borohydride and complexes with an acid, such as dilute acetic, HCl and $H_2SO_4$, to soluble salts which can be separated from the crude alcohol product, following which the crude alcohol may be recovered by distillation and further purified by fractionation.

The following examples will serve to illustrate the objects and practice of the present invention. Parts and percentages are by weight unless otherwise stated.

EXAMPLE 1

A 250 ml. three-necked flask, equipped with a dropping funnel, a stirrer, a thermometer and a reflux condenser, was charged with a mixture of 3.2 g. (0.085 mole) of $NaBH_4$ and 40 g. of anhydrous dioxane. The mixture was cooled to about 9° C. by means of an ice water bath, following which 75 g. (0.34 mole) of 2,3-dichlorotetrafluoro-2-cyclopenten-1-one were added gradually, with stirring, over a period of about ½ hour. During the addition the reaction temperature rose to about 25° C. The reaction mixture was then heated to about 70° C. and maintained at that temperature for a period of about one hour. At the end of this period the reaction mixture was cooled to about room temperature and the excess $NaBH_4$ reagent and $NaBH_4$ complexes which had been formed therein were decomposed by the addition of about 75 ml. of dilute (about 20%) HCl. The product mixture consisted of a heavy oil layer and a lighter aqueous layer. The oil layer was separated from the aqueous layer, washed again with dilute HCl, taken up in benzene and the water azeotroped off. Finally the oil layer was distilled to give 54 g. (0.24 mole, 71% yield) of 1-hydro-2,3-dichlorotetrafluoro-2-cyclopenten-1-ol (B.P. 168–170° C./760 mm.). This material was recrystallized from n-hexane giving a white crystalline solid (M.P. 59–60° C.).

*Analysis.*—Calculated for $C_5F_4Cl_2H_2O$: C, 26.67; F, 33.78; Cl, 31.55; H, 0.9%. Found: C, 27.0; F, 34.2; Cl, 30.7; H, 1.37%.

Infrared spectrographic analysis of this product showed a hydroxyl absorption band at 2.6 microns and a C=C absorption band at 6.18 microns, thus confirming the identification of the product. Nuclear magnetic resonance spectrographic analysis also agreed with the assigned srtucture.

EXAMPLE 2

A 250 ml. three-necked flask, equipped with a dropping funnel, a stirrer, a thermometer and a reflux condenser, was charged with a mixture of 2.6 g. (0.068 mole) of $NaBH_4$ and 40 g. of anhydrous dioxane. 75 g. (0.27 mole) of 2,3-dichlorohexafluoro-2-cyclohexen-1-one were slowly added to the reaction mixture with stirring and with ice water cooling, so that the temperature in the reaction flask did not exceed about 25° C. When the ketone reactant was completely added, the reaction mixture was heated to about 70° C. and maintained at that temperature, with stirring, for a period of about one hour. At the end of this period the excess $NaBH_4$ reagent and $NaBH_4$ complexes formed were decomposed by the addition of about 75 ml. of dilute (about 20%) HCl. The reaction product was worked up in the same manner as described in Example 1. From the distillation were obtained 46 g. (0.17 mole, 63% yield) of 1-hydro-2,3-dichlorohexafluoro-2-cyclohexen-1-ol (B.P. 178–182° C./760 mm.). The purified product was a white crystalline solid possessing a melting point of 40–42° C.

*Analysis.*—Calculated for $C_6F_6Cl_2H_2O$: C, 26.18; F, 41.45; Cl, 25.82; H, 0.73%. Found: C, 26.0; F, 40.8; Cl, 25.4; H, 1.1%.

Infrared spectrographic analysis of this product showed a hydroxyl absorption band at 2.6 microns and a C=C absorption band at 6.15 microns, thus confirming the identification of the product. Nuclear magnetic resonance spectrographic analysis also agreed with the assigned structure.

EXAMPLE 3

Into identical apparatus as described in Example 1 were added 3.78 g. (0.10 mole) of $NaBH_4$ and 50 ml. of anhydrous diethyl ether. The mixture was cooled to about 5° C. by means of an ice water bath following which 50 g. (0.20 mole) of 2,3-dichlorotetrafluoro-2-cyclohexen-1,4-dione were added dropwise over a period of about ½ hour. At the end of this period the reaction mixture was heated to reflux temperature and maintained at that temperature for a period of about 2½ hours. At the end of this period the excess of $NaBH_4$ reagent and $NaBH_4$ complexes formed were decomposed by the addition of about 75 ml. of dilute (about 20%) HCl. The product was worked up in the same manner as described in Example 1. On distillation there were obtained 12 g. (0.047 mole, 23% yield) of 1,4-dihydro-2,3-dichlorotetrafluoro-2-cyclohexen-1,4-diol (B.P. 142–144° C./20 mm). The purified recrystallized product was a white crystalline solid having a melting point of 118–119° C.

*Analysis.*—Calcaulated for $C_6F_4Cl_2H_4O_2$: C, 28.23; F, 29.80; Cl, 27.84; H, 1.57%. Found: C, 28.3; F, 28.1; Cl, 27.4; H, 1.71%.

Infrared spectrographic analysis of this product showed the presence of a strong hydroxyl absorption band at 2.9–3.0 microns and a C=C absorption band at 6.14 microns, thus confirming the identification of the product. Nuclear magnetic resonance spectrographic analysis also agreed with the assigned structure.

EXAMPLE 4

Into apparatus as described in Example 1 were added 7.2 g. (0.19 mole) of $NaBH_4$ and 100 ml. of anhydrous diethyl ether. The mixture was cooled to about 5° C. by means of an ice water bath following which 77 g. (0.38 mole) of 2,3-dichlorodifluoro-2-cyclopenten-1,4-dione were added dropwise over a period of about ¼ hour. At the end of this period the reaction was heated to reflux temperature and maintained at that temperature for a period of about 2½ hours. At the end of this period the excess $NaBH_4$ reagent and $NaBH_4$ complexes formed were decomposed by the addition of about 75 ml. of dilute (about 20%) HCl. The product was worked up in the same manner as described in Example 1. On distillation there were obtained 23 g. (0.11 mole, 29% yield) of 1,4-dihydro-2,3-dichlorodifluoro-2-cyclopenten-1,4-diol. The purified recrystallized product was a white crystalline solid having a melting point of 129–130° C.

*Analysis.*—Calculated for $C_5F_2Cl_2H_4O_2$: C, 29.27; F, 18.54; Cl, 34.63; H, 1.95%. Found: C, 29.6; F, 18.2; Cl, 34.2; H, 1.68%.

Infrared spectrographic analysis of this product showed the presence of a strong hydroxyl absorption band at 3.0 microns and a C=C absorption band at 6.14 microns, thus confirming the identification of the product. Nuclear magnetic resonance spectrographic analysis also agreed with the assigned structure.

EXAMPLES 5–12

In the following examples, the procedures are carried out in the same type apparatus, substantially as described in Example 1 excepting that the ketone starting materials vary as indicated in the first column of following Table I, the polar solvent varies, as indicated in the second column and the corresponding alcohol products vary as indicated in the third column.

TABLE I

| Example | Ketone Starting Material | Solvent | Alcohol End Product |
|---|---|---|---|
| 5 | 4,4-dichlorotetrafluoro-2-cyclopenten-1-one | Diethyl ether | 1-hydro-4,4-dichlorotetrafluoro-2-cyclopenten-1-ol. |
| 6 | 2,5,5-trichlorotrifluoro-2-cyclopenten-1-one | Dioxane | 1-hydro-2,5,5-trichlorotrifluoro-2-cyclopenten-1-ol. |
| 7 | Perfluoro-2-cyclopenten-1-one | do | 1-hydro-perfluoro-2-cyclopenten-1-ol. |
| 8 | 2,5-dichlorodifluoro-2-cyclopenten-1,4-dione | Diethyl ether | 1,4-dihydro-2,5-dichlorodifluoro-2-cyclopenten-1,4-diol. |
| 9 | 2,3,4,5-pentachlorotrifluoro-2-cyclohexen-1-one | Diglyme | 1-hydro-2,3,4,5,6-pentachlorotrifluoro-2-cyclohexen-1-ol. |
| 10 | 3,6,6-trichloropentafluoro-2-cyclohexen-1-one | do | 1,4-dihydro-5,5-dichlorotetrafluoro-2-cyclohexen-1,4-diol. |
| 11 | 5,5-dichlorotetrafluoro-2-cyclohexen-1,4-dione | Dioxane | 1,4-dihydro-perfluoro-2-cyclohexen-1,4-diol. |
| 12 | Perfluoro-2-cyclohexen-1,4-dione | Diglyme | 1-hydro-3,6,6-trichloropentafluoro-2-cyclohexen-1-ol. |

EXAMPLE 13

1-hydro-2,3-dichlorotetrafluoro-2-cyclopenten-1-ol, 1-hydro-2,3-dichlorohexafluoro-2-cyclohexen-1-ol, 1,4-dihydro-1,2,3-dichlorodifluoro-2-cyclopenten-1,4-diol and 1,4-dihydro-2,3-dichlorotetrafluoro-2-cyclohexen-1,4-diol were tested as sealing adjuvants for thermoplastic film composed of a copolymer of about 96% trifluorochloroethylene and about 4% vinylidene fluoride. Saturated solutions of this polymer in the above alcohols were prepared by separately refluxing about 10 parts of each alcohol with one part of the polymer, cooling the mixtures to room temperature and decanting the solutions from the undissolved polymer. A portion of each solution was spread in a thin film (about 0.1–0.2 mil in thickness) on a two mil thick film of the same type copolymer. The coated films were then folded over onto a coated portion of the film and the two layers thus formed were sealed on a bar-type sealer by subjecting the film to a temperature of 375° F. at 30 p.s.i. for a period of three second. For comparative purposes, an untreated film of the same copolymer was folded and heat-sealed under the same conditions. All of the sealed films were then tested for seal strength by cutting the films into sections having 1" square seal portions with unsealed flaps at each end. One flap was secured in a clamp, the other flap was subjected to weights applied vertically to determine the weight necessary to rupture or pull apart the seal. It was found that the sealing adjuvants not only formed a strong seal between the polymer film sections, but that additionally, the polymer film itself was strengthened in varying degrees in the vicinity of the seal, for when weight was applied to rupture the seal, it was found that in all cases in which the alcohol sealing adjuvants had been employed; the strength of the seal formed was greater than that of the polymer itself, so that upon the application of sufficient weight, the film itself tore before the seal gave way. In the case of the polymer film section in which no sealing adjuvant had been employed, the seal opened at a weight considerably less than those weights at which the film tore when the alcohols of the invention were used as sealing adjuvants. The comparative results of the above tests are shown in following Table II.

TABLE II

| | Weight to Effect Rupture, g. | Type Rupture |
|---|---|---|
| Film strips heat-sealed without the use of adjuvant. | <10 | Seal opened. |
| Film strips heat-sealed with a 10% polymer solution in 1-hydro-2,3-dichlorotetrafluoro-2-cyclopenten-1-ol. | 2,500 | Film tore. |
| Film strips heat-sealed with a 10% polymer solution in 1-hydro-2,3-dichlorohexafluoro-2-cyclohexen-1-ol. | 2,045 | Do. |
| Film strips heat-sealed with a 10% polymer solution in 1,4-dihydro-2,3-dichlorodifluoro-2-cyclopenten-1,4-diol. | 1,590 | Do. |
| Film strips heat-sealed with a 10% polymer solution in 1,4-dihydro-2,3-dichlorotetrafluoro-2-cyclohexen-1,4-diol. | 1,132 | Do. |

When other chlorine containing hydro alcohols within the scope of the invention are employed as sealing adjuvants for such polymer film strips, as described above, substantially equivalent results are obtained, i.e., film strips heat-sealed using such materials as sealing adjuvants rupture at weights considerably higher than film strips heat-sealed without the use of sealing adjuvant.

Although a copolymer of about 96% trifluorochloroethylene and about 4% vinylidene fluoride was employed, a wide variety of polymers, terpolymers and copolymers of trifluorochloroethylene may be employed, also with equivalent results; homopolymeric trifluorochloroethylene and copolymers of trifluorochloroethylene with vinyl chloride, 1,1-chlorofluoroethylene, trifluoroethylene and perfluorobutadiene being exemplary. In general, most suitable are those compositions containing upwards of 50% by weight of trifluorochloroethylene. The general class of compositions described above can be referred to generically as polytrifluorochloroethylene.

EXAMPLE 14

A mixture of one part Capran film and 12 parts of 1-hydro-perfluoro-2-cyclopenten-1-ol is refluxed in a 150 ml. round bottom flask for a period of one hour. A viscous homogeneous solution is obtained after the reflux mixture cools to room temperature. A flexible, transparent, plastic (Capran) film is then easily prepared by flowing the solution of Capran, thus obtained by the above procedure, on to a polished plate, evaporating the essentially alcohol solvent and peeling the resulting film from the plate.

EXAMPLE 15

The procedure of Example 14 is repeated, excepting that a mixture of one part Capran to 12 parts of 1,4-dihydro-perfluoro-2-cyclohexen-1,4-diol is initially employed. A flexible, transparent, plastic (Capran) film may be easily prepared from a solution of Capran in the 1,4-dihydro-perfluoro-2-cyclohexen-1,4-diol solvent, as described in above Example 14.

The invention has been discussed particularly with reference to a number of specific compounds, however, such are to be understood as being illustrative only and the invention is to be limited only by the scope of the appended claims.

We claim:
1. Hydroperhalogenated cycloalkenyl alcohols of the formula:

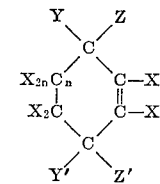

wherein $n$ is 0 or 1; X is F or Cl; Y or Y' is Cl, F or H and Z or Z' is Cl, F or OH; provided that at least one of Y or Y' is H and that when Y is H, Z is OH and when Y' is H, Z' is OH and also provided that there is present at least two fluorine atoms in the molecule.

2. Hydroperhalogenated cycloalkenyl alcohols as defined in claim 1 wherein $n$ is 0.

3. Hydroperhalogenated cycloalkenyl alcohols as defined in claim 1 wherein $n$ is 1.

4. Hydroperhalogenated cycloalkenyl alcohols according to claim 1 which contain at least two chlorine atoms in the molecule.

5. Hydroperhalogenated cycloalkenyl alcohols according to claim 4 in which $n$ is 0.

6. Hydroperhalogenated cycloalkenyl alcohols according to claim 4 in which $n$ is 1.

7. Hydroperhalogenated cycloalkenyl alcohols according to claim 4 in which Y is H, Z is OH, Y' is F and Z' is F.

8. Hydroperhalogenated cycloalkenyl alcohols according to claim 4 in which Y is H, Z is OH, Y' is H and Z' is OH.

9. 1-hydro-2,3-dichlorotetrafluoro-2-cyclopenten-1-ol.
10. 1-hydro-2,3-dichlorohexafluoro-2-cyclohexen-1-ol.
11. 1,4-dihydro-2,3-dichlorodifluoro-2-cyclopenten-1,4-diol.

12. 1,4-dihydro-2,3-dichlorotetrafluoro-2-cyclohexen-1,4-diol.

References Cited

UNITED STATES PATENTS

| | | | |
|---|---|---|---|
| 2,871,255 | 1/1959 | Molotsky et al. | 260—617 |
| 3,285,975 | 11/1966 | Ahlbrecht | 260—617 |
| 3,322,837 | 5/1967 | Weil et al. | 260—617 |
| 3,350,464 | 10/1967 | Anello et al. | 260—631 |
| 2,972,562 | 2/1961 | Richter | 260—617 X |
| 3,030,409 | 4/1962 | Andreades et al. | 260—617 X |

OTHER REFERENCES

Andreades et al., "J. Am. Chem. Soc.," vol. 83, pp. 4670–1 (1961).

Burdon et al., "J. Chem. Soc.," 1965, pp. 2382–91.

Finger et al., "J. Am. Chem. Soc.," vol. 73, pp. 145–49 (1951).

Jones et al., "J. Am. Chem. Soc.," vol. 84, pp. 997–1001 (1962).

Chaikin et al., "J. Am. Chem. Soc.," vol. 71, pp. 122–25 (1949).

Le Bel et al., "J. Org. Chem.," vol. 26, pp. 4768–70 (1961).

LEON ZITVER, Primary Examiner

JOSEPH E. EVANS, Assistant Examiner

U.S. Cl. X.R.

252—364, 8.6; 260—486, 586, 648, 33.4